US008437999B2

(12) United States Patent
Pita et al.

(10) Patent No.: US 8,437,999 B2
(45) Date of Patent: May 7, 2013

(54) SEISMIC-SCALE RESERVOIR SIMULATION OF GIANT SUBSURFACE RESERVOIRS USING GPU-ACCELERATED LINEAR EQUATION SYSTEMS

(75) Inventors: Jorge A. Pita, Dhahran (SA); Nabil M. Al-Zamel, Dhahran (SA); Ali H. Dogru, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 285 days.

(21) Appl. No.: 13/023,076

(22) Filed: Feb. 8, 2011

(65) Prior Publication Data

US 2012/0203515 A1   Aug. 9, 2012

(51) Int. Cl.
*G06F 7/48* (2006.01)
(52) U.S. Cl.
USPC .......................................................... 703/10
(58) Field of Classification Search ................. 703/9, 10; 702/11, 12, 14
See application file for complete search history.

(56) References Cited

U.S. PATENT DOCUMENTS

| 7,373,285 | B2 | 5/2008 | Webb |
| 7,516,056 | B2 | 4/2009 | Wallis |
| 7,526,418 | B2 | 4/2009 | Pita |
| 7,548,840 | B2 | 6/2009 | Saaf |
| 7,596,480 | B2 | 9/2009 | Fung |
| 7,660,711 | B2 | 2/2010 | Pita |
| 7,684,967 | B2 | 3/2010 | Wallis |
| 2006/0184329 | A1* | 8/2006 | Rowan et al. .................. 702/50 |
| 2007/0279429 | A1 | 12/2007 | Ganzer |
| 2009/0276100 | A1 | 11/2009 | Malki |
| 2010/0157732 | A1 | 6/2010 | Saenger et al. |
| 2011/0120702 | A1 | 5/2011 | Craig |
| 2012/0191432 | A1* | 7/2012 | Khataniar et al. .............. 703/10 |

FOREIGN PATENT DOCUMENTS

| EP | 1869579 A2 | 12/2007 |
| WO | 2006/020952 A2 | 2/2006 |

OTHER PUBLICATIONS

Efficient Shallow Water Simulations on GPUs: Implementation, Visualization, Verification, and Validation, 17 pages, 2010.*
Baker et al., MIMD Implementations of Linear Solvers for Oil Reservoir Simulation, Parallel Computing, Elsevier Publishers, Amsterdam, NL, vol. 16, No. 2-3, Dec. 1, 1990, pp. 313-334, XP026758627.
Wallis et al., Constrained Residual Acceleration of Conjugate Residual Methods, SPE Papers, No. 13536, Jan. 1, 1985, pp. 415-428, XP000910569.
Dogru et al., A Next-Generation Parallel Reservoir Simulator for Giant Reservoirs, Society of Petroleum Engineers Journal, 119272, Feb. 2009, pp. 1-29, XP002679660.

(Continued)

*Primary Examiner* — David Silver
*Assistant Examiner* — Andre Pierre Louis
(74) *Attorney, Agent, or Firm* — Bracewell & Giuliani LLP

(57) ABSTRACT

A computer-based system performs iterative linear solution of giant systems of linear equations with the computational acceleration capabilities of GPU's (Graphical Processing Units). Processing is performed in a heterogeneous (hybrid) computer environment composed of both computer data processing units (CPU's) and GPU's. The computational acceleration in processing provides an order of magnitude speed improvement over other methodology which utilizes only CPU's. The present invention enables reservoir studies to be carried out within time constraints, and real-time reservoir simulations to be made while keeping pace with online data acquisition.

24 Claims, 9 Drawing Sheets
(3 of 9 Drawing Sheet(s) Filed in Color)

OTHER PUBLICATIONS

Bydal, GPU-Accelerated Simulation of Flow Through a Porous Medium, May 25, 2009, pp. 11-15, University of Agder, Agder, XP002679661.

Naimi-Tajdar et al., A Fully Implicit, Compositional, Parallel Simulator for IOR Processes in Fractured Reservoirs, Society of Petroleum Engineers Journal, vol. 12, No. 3, Sep. 2007, pp. 367-381, XP002679662.

Han et al., Coupling Equation-of-State Compositional and Surfactant Models in a Fully Implicit Parallel Reservoir Simulator Using the Equivalent-Alkane-Carbon-Number Concept, Society of Petroleum Engineers Journal, vol. 14, No. 2, Jun. 2009, pp. 302-310, XP002679663.

PCT/US2012/023429 International Search Report and Written Opinion dated Aug. 21, 2012.

PCT/US2011/042085 International Search Report and Written Opinion dated Aug. 22, 2012.

Partial File History of Co-pending U.S. Appl. No. 12/827,477.

Co-pending U.S. Appl. No. 12/827,477, filed Jun. 30, 2010 and titled "Reservoir Simulation of Giant Subsurface Reservoirs with Accelerated Phase Equilibrium Determination".

Saad, Yousef, "Iterative Methods for Sparse Linear Systems", Society for Industrial and Applied Mathematics, 2003, Second Edition, pp. 204-228.

* cited by examiner

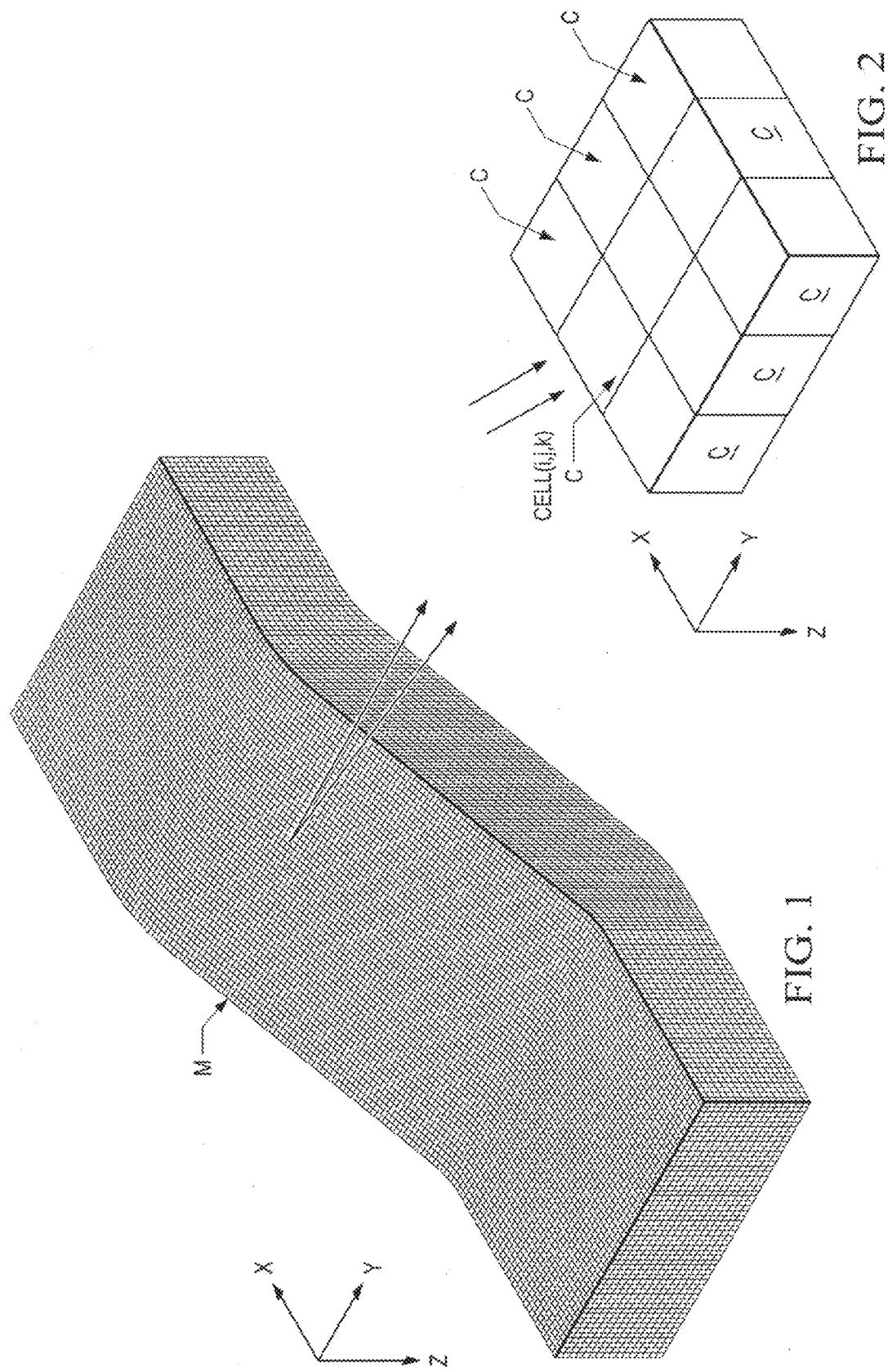

SEISMIC-SCALE RESERVOIR SIMULATION OF GIANT SUBSURFACE RESERVOIRS USING GPU-ACCELERATED LINEAR EQUATION SYSTEMS

CROSS-REFERENCE TO RELATED APPLICATIONS

The present invention relates to computerized simulation of giant subsurface reservoirs, as does commonly owned, U.S. patent application Ser. No. 12/827,477, "Reservoir Simulation of Giant Subsurface Reservoirs with Accelerated Phase Equilibrium Determination", filed Jun. 30, 2010, and now U.S. Pat. No. 8,359,185, of which Applicants are co-inventors.

BACKGROUND OF THE INVENTION

1. Field of the Invention

The present invention relates to computerized simulation of hydrocarbon reservoirs in the earth, and in particular to simulation and forecasting of production from such reservoirs with determination of fluid motion conditions in cells of the reservoirs.

2. Description of the Related Art

The early development of compositional reservoir simulators in the industry was, so far as is known, restricted to reservoir models small enough to be characterized by a relatively small number of cells (of the order of 100,000) into which the reservoir of interest was organized. Models of this early type provided adequate numerical resolution for small to medium size reservoirs or fields.

The early models became too coarse in data content and accuracy for what have become known as giant oil and gas fields. Giant reservoirs are those mammoth subsurface reservoirs at various locations on the earth containing hydrocarbons and other fluids. In giant reservoirs, there may be thousands of wells, and possibly hundreds of well groups, with tens of thousands of completions, when the total number of wells is considered. For giant reservoirs, the sheer volume of the data involved became a problem in simulation and analysis of performance over a period of time.

In addition, the increased accuracy of detailed seismic-data which samples the reservoir at 25-meter areal (x and y) intervals, has begun to demand models of hundreds of millions to billions of cells to assimilate all the available detail, which in turn has been intended to result in more accurate predictions over the life of the reservoir and lead to higher ultimate oil and gas recovery.

There has also been increased interest in reservoir analysis for taking into account enhanced oil recovery methods and $CO_2$ sequestration. In order that simulation results for this purpose be accurate, inorganic components (such as nitrogen, $CO_2$, sulfides, for example) had to be included along with the hydrocarbons and water as reservoir fluids which would be present in the reservoirs as a result of these processes. Inclusion of inorganic components into the reservoir simulation process thus added to the already large number of reservoir hydrocarbon components and water.

Compositional reservoir simulation has required fast and accurate solution of a linearized system of equations regarding unknown parameters or variables of interest in each of the grid blocks in the reservoir at each Newton iteration of every time step. Given the increasing role of compositional simulation for more accurate fluid description and in enhanced oil recovery methods and CO2 sequestration, the number of unknowns per grid-block has increased from an original 3 for black-oil problems to 10 or more in compositional models. At the same time, a technique known as seismic-scale reservoir simulation with more detailed geological description via integration of seismic data has increased the number of grid blocks into the hundreds of millions to billions.

Iterative linear solution of large systems of equations has become an essential component of oil-and-gas industry reservoir simulations, often accounting for 40% or more of total simulation time. Faster linear solution computations therefore mean quicker turnaround time in reservoir simulation since this linearized system of reservoir equations must be solved several times, about 3 to 7 (once for every Newton iteration in a time-step). Reservoir simulations have required thousands of these time-steps.

The linear solver determines the "correction" required for the Newton iteration to converge to the solution of the underlying non-linear system of equations. Simulation speed is becoming all the more essential as what are known as Intelligent Field operations capture field data in real-time and require a simulation capability that can keep up with online data acquisition rates.

U.S. Pat. No. 7,526,418, of which Applicants are co-inventors, and which is of common ownership to the present invention, is a compositional reservoir simulator which performed simulations in shared memory supercomputers, distributed memory supercomputers or clusters of personal computers (PC's) configured as computer data processing units (CPU's). Other reservoir simulation efforts using CPU's are U.S. Pat. Nos. 7,516,056 and 7,684,967.

SUMMARY OF THE INVENTION

Briefly, the present invention provides a new and improved computer implemented method of simulation of a giant subsurface reservoir in a computer system of a plurality of data processors which include at least one central processing unit and at least one graphical processing unit and an output display. The computerized simulation according to the present invention is an iterative linear solution of equations for reservoir parameters of a giant subsurface reservoir, and the giant subsurface reservoir being simulated as a model is partitioned into a number of cells arranged in an organized system of cells. The simulation is further based on geological and fluid characterization information for the cells of the reservoir. The computer implemented method receives geological and fluid characterization information for the cells and the reservoir in the central processing unit. A postulated system solution matrix is initialized in the central processing unit for the equations for parameters of the reservoir cells for transfer to the graphical processing unit. A preconditioned conjugate-gradient extrapolation is preformed in the graphical processing unit on the initialized postulated system solution matrix received from the central processing unit to determine reservoir parameters. The results of the preconditioned conjugate-gradient extrapolation of the initialized postulated system containing reservoir parameters are then transformed in the central processing unit to the system solution matrix, and an output display is formed of the reservoir parameters of the cells at desired locations in the giant subsurface reservoir to simulate performance and production from the giant reservoir.

The present invention also provides a new and improved data processing system for computerized simulation of state changes of fluids in underground layered formations of a reservoir in the earth. The data processing system comprises a central processor which receives geological and fluid characterization information for the cells and the reservoir, and initializes a postulated system solution matrix for the equations for parameters of the reservoir cells for transfer to the graphical processing unit. The data processing system also includes a graphical processor which performs a preconditioned conjugate-gradient extrapolation on the initialized postulated system solution matrix received from the central processing unit to determine reservoir parameters. The central processing unit also then transforms the results of the preconditioned conjugate-gradient extrapolation of the initialized postulated system containing reservoir parameters to the system solution matrix. The data processing system also includes a memory for storing the determined reservoir parameters of the cells.

The present invention also provides a new and improved data storage device having stored in a computer readable medium computer operable instructions for causing a data processing system which is composed of at least one central processing unit and at least one graphical processing unit, and an output display to simulate state changes of fluids in underground layered formations in the earth. The instructions stored in the data storage device cause the data processing system to receive geological and fluid characterization information for the cells and the reservoir in the central processing unit, and initialize a postulated system solution matrix in the central processing unit for the equations for parameters of the reservoir cells for transfer to the graphical processing unit. The instructions stored in the data storage device further cause the data processing system to perform a preconditioned conjugate-gradient extrapolation in the graphical processing unit on the initialized postulated system solution matrix received from the central processing unit to determine reservoir parameters. The instructions stored in the data storage device cause the data processing system to transform in the central processing unit the results of the preconditioned conjugate-gradient extrapolation of the initialized postulated system containing reservoir parameters to the system solution matrix, and form an output display of the reservoir parameters of the cells at desired locations in the giant subsurface reservoir to simulate performance and production from the giant reservoir.

BRIEF DESCRIPTION OF THE DRAWINGS

The patent application file contains at least one drawing executed in color. Copies of this patent application publication with color drawings will be provided by the Office upon request and payment of necessary fee.

FIG. 1 is an isometric view of a compositional model of a giant subterranean hydrocarbon reservoir organized into a number of cells.

FIG. 2 is an enlarged isometric view of a group of adjacent cells from the compositional hydrocarbon reservoir model of FIG. 1.

DETAILED DESCRIPTION OF THE PREFERRED EMBODIMENTS

Figure 3:
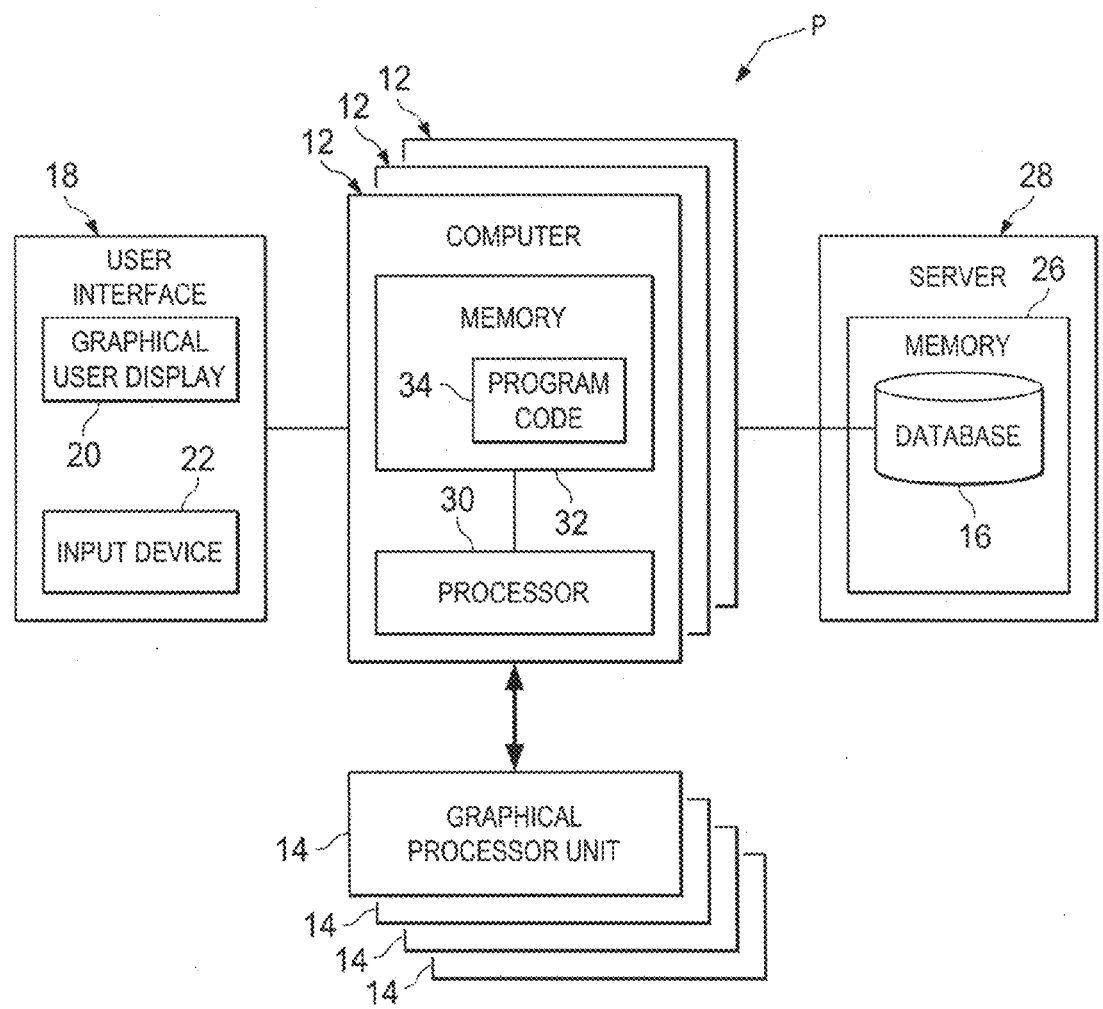
FIG. 3 is a schematic diagram of a computer system organized for reservoir simulation according to the present invention.

In the drawings, the letter M designates a simplified model of a portion of a subsurface hydrocarbon reservoir for which production results based on operating conditions and parameters are simulated over an estimated production life according to the present invention based on geological and fluid characterization information obtained for the cells of the reservoir. The results obtained are thus available and used for simulation of historical performance and for forecasting of production from the reservoir. Based on the results of such simulation, compositional models such as those described and shown in U.S. Pat. No. 7,526,418 are then formed and are available for evaluation and analysis. U.S. Pat. No. 7,526,418 is owned by the assignee of the present invention and is incorporated herein by reference An example reservoir of the type for which production data are simulated over the expected reservoir life as illustrated by the model M is usually one which is known to those in the art as a giant reservoir. A giant reservoir may be several miles in length, breadth and depth in its extent beneath the earth and might, for example, have a volume or size on the order of three hundred billion cubic feet.

The model M is partitioned into a number of cells C of suitable dimensions, several adjacent ones of which are depicted in FIG. 2 in enlarged form and scale from FIG. 1. In partitioning the volume of the reservoir into units at what is known as seismic-scale for analytical purposes, typical cells are each eighty or so feet along their lateral or areal dimensions in a common plane of reference in the reservoir. In some models, the thickness of a cell can be fifteen or less feet in depth or thickness at that location in the reservoir, and even less, down to half a foot.

The model M of FIG. 1 thus represents a reservoir composed of a million or more cells having these dimensions. As noted, in the ease of seismic scale data the number of cells hundreds or more times larger than this. It will be appreciated that the cells C shown in the drawings as fowling the model M are considerably enlarged for illustrative purposes in comparison with the model M. Further information about models of this size and complexity is set forth in previously mentioned, incorporated by reference U.S. Pat. No. 7,526,418.

In the cells C of the model M, a fluid pressure is present, as well as moles $N_i$ of various components of a compositional fluid. At present, it is desirable for reservoir simulation purposes to analyze reservoir production data for as many as eight to seventeen (or more) possible component hydrocarbon fluids having moles $N_i$ through $N_n$, inclusive, as well as water having moles $N_w$ possible present as component fluids in the compositional fluid of the cells C. Further, there is a linearized system of equations regarding unknown reservoir parameters or variables of interest for the grid blocks in the reservoir at each Newton iteration of every time step. In these equations, the number of unknowns per grid-block has increased from an original 3 for black-oil problems to 10 or more in compositional models.

Geometrically, for reference and location purposes, each individual cell C in the model M is located at a number co-ordinate location I, J, K in an x, y, z co-ordinate system, as shown in FIG. 1 at co-ordinates x=I; y=J; and z=K. As mentioned there may be from three to ten or more unknowns in the linearized system of equations for the individual cells of the grid blocks in the reservoir at each Newton iteration of every time step.

It can thus be appreciated that the number of cells and unknowns in the linearized system of equations for the individual cells or grid blocks in the model M are vastly beyond the normal processing capabilities of conventional reservoir simulators, and that the reservoir would be considered giant. The data to be processed for seismic-scale reservoir simulation is even larger by orders of magnitude which could exceed a hundred.

Thus, simulation of a reservoir of this size was, so far as is known, possible only by simplifications or assumptions which would compromise the accuracy of the simulation results, as has also been described above. U.S. Pat. Nos. 7,526,418, 7,660,711 and 7,596,480 which are owned by the assignee of the present application are examples of ways to reduce the effects of some of these simplifications and assumptions. Some of these patents, such as U.S. Pat. Nos. 7,526,418 and 7,660,711 have used equation of state (EOS) processing techniques for the phase equilibrium determination portion of the simulation process for reservoirs.

With the present invention, as is shown schematically in FIG. 2 a suitable group G of adjacent cells C in a particular region or subdivision of the model M are allocated by the data processing system P to a particular node of a CPU 12 (FIG. 3) and a group of Graphical Processing Units or GPU's 14 (FIG. 3) for processing. Thus, multiple computing nodes (typically composed of one or more multi-core CPU's and one or more many-core GPU's can be used in parallel in order to subdivide the reservoir into separate computational tasks, so that each CPU-GPU node or combination processes the data in its particular assigned subdivision of the reservoir.

In this fashion, reservoir models composed of millions to billions of cells can be tackled in parallel by assigning several tens of thousands (or even more) of cells of one group G to a particular CPU-GPU combination dedicated to those cells for computational processing of the linearized system of reservoir equations. Due to the compositional nature of most reservoir simulation computations, the linear solution must accommodate multiple-unknowns per grid-block. For example, there are 3 for black-oil, but 8 or more for compositional models, with some fluid characterizations reaching 17 components. The present invention adds to the GPU advantage by optimizing the way these computations are carried out in the multi-threaded GPU architecture.

Considering now the data processing system according to the present invention, as illustrated in FIG. 3, a data processing system P is provided for computerized simulation of fluid motion between the grid blocks in the model M of the reservoir at each Newton iteration of every time step of interest. The data processing system P includes one or more central processing units or CPU's 12. The CPU or CPU's 12 has associated therewith a reservoir memory or database 16 for reservoir cell geological and fluid characterization information and a user interface 18. The user interface 18 includes a graphical display 20 for displaying graphical images, a printer or other suitable image forming mechanism and a user input device 22 to provide a user access to manipulate, access and provide output forms of processing results, database records and other information.

The reservoir memory or database 16 is typically in a memory 26 of an external data storage computer 28. The insertion database 16 contains data including the structure, location and organization of the cells in the model M, and data regarding wells, processing facilities, time-related well production data including measured static downhole pressure data, time-related injection well data including measured wellhead pressure and injection rate data, geological information and fluid characterization information and other reservoir production records and parameters for use in reservoir simulation, as will be described below.

The CPU computer, 12 of data processing system. P includes a processor 30 and an internal memory 32 coupled to the processor 30 to store operating instructions, control information and to serve as storage or transfer buffers as required. The data processing system P includes program code 34 stored in a memory 32 of the CPU or CPU's 14. The program code 34, according to the present invention, is in the form of computer operable instructions causing the CPU's 12 transfer data back, and forth for processing by GPU's 14 to simulate fluid motion in the reservoir, as will be set forth.

It should be noted that program code 34 may be in the form of microcode, programs, routines, or symbolic computer operable languages that provide a specific set of ordered operations that control the functioning of the data processing system P and direct its operation. The instructions of program code 34 may be stored in memory 32 or on computer diskette, magnetic tape, conventional hard disk drive, electronic read-only memory, optical storage device, or other appropriate data storage device having a computer usable medium stored thereon. Program code 34 may also be contained on a data storage device as a computer readable medium.

The graphical units or GPU's 14 are general purpose, programmable graphical processing units, often also referred to as GPU's. The GPU's 14 are programmed to determine unknowns, using a linearized system of equations for the individual cells, as will be set forth.

Although the present invention is independent of the specific computer hardware used, one embodiment of the present invention is based on a suitable number of quad-core CPU's and multi-core GPU's. The CPU's 12 used in an example embodiment of the system are in the form of AMD quad-core Nehalem processors, and the GPU 14's are in the example embodiment preferably 240-core NVidia Tesla S1070 GPU's. It should be understood, however, that other computer hardware may also be used, as will be set forth below.

The present invention utilizes a dual-tier approach to acceleration via the GPU's 14 which deliver nearly an order-of-magnitude speed improvement over earlier methods. The present invention accomplishes reservoir simulation in a heterogeneous (hybrid) computer environment including both CPU's 12 and GPU's 14. The present invention thus provides a computer-based system for conducting seismic-scale reservoir simulation of giant subsurface reservoirs using GPU-accelerated linear equation systems. The present invention is designed and implemented to utilize the computational acceleration capabilities of the GPU's 14.

The acceleration of the linearized equation system processing sequence of the reservoir simulation process by nearly an order of magnitude or more obtained in the present invention can have a substantial impact in saving computer time, reducing costs and also allowing more reservoir studies to be carried out within given time constraints. Another important application of the present invention is in online/interactive reservoir simulation to monitor producing oil and gas fields (I-Field technology). As will be set forth, processing times have achieved a speed up by a factor of nine in some instances. Acceleration of the computations by GPU in the present invention enables much faster determinations than previously possible, so that the reservoir simulator can keep pace with real-time data acquisition of field measurements.

Figure 4:
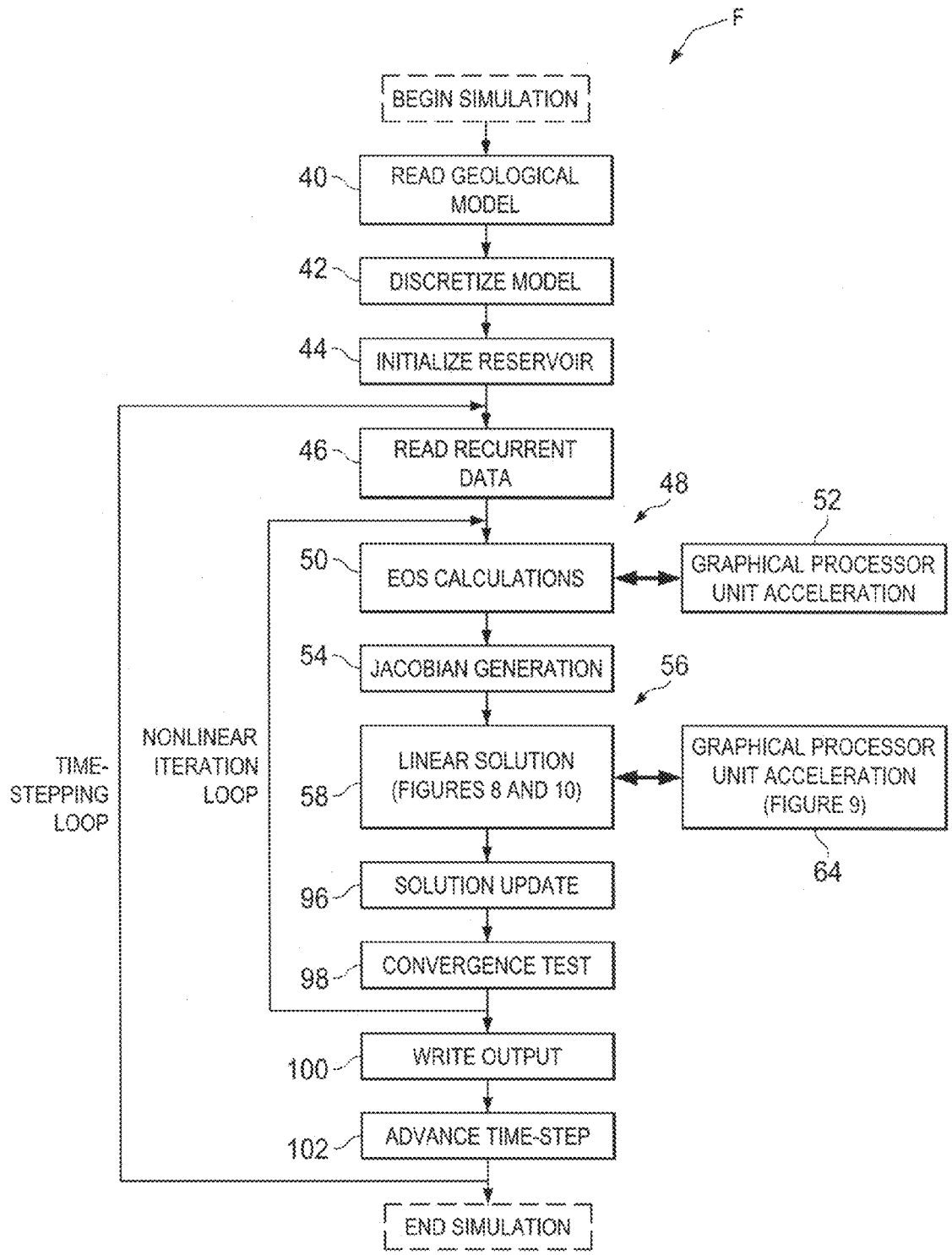
FIG. 4 is a functional block diagram of a portion of a set of data processing steps performed in a computer data processing unit or CPU of the computer system of FIG. 3 during computerized reservoir simulation of a subterranean reservoir according to the present invention.

A flowchart F (FIG. 4) indicates the basic computer processing sequence of the present invention and the computational sequence taking place during application of a typical embodiment of the present invention.

Read Geological Model, (Step 40): Simulation according to the present invention begins by reading the geological model as input and the time-invariant data. The geological model read in during step 40 takes the form of binary data containing one value per grid cell of each reservoir model property. These properties include the following: rock permeability tensor; rock porosity, individual cell dimensions in the x, y and z directions; top depth of each cell; and x-y-z location of each existing fluid contacts (gas-oil-contact, gas-water-contact, and oil-water-contact, as applicable).

Time-invariant data read in during step 40 include the fluid characterization composition and thermodynamic properties of each component (critical temperature, critical pressure, critical volume, accentric factor, molecular weight, parachor, shift parameter and binary interaction coefficients). The time-invariant data also includes fluid relative permeability tables that provide a value of relative permeability for a given fluid saturation for the reservoir rock in question, and reservoir temperature since the present model is isothermal.

Discretize Model (Step 42): Calculation of rock transmissibilities for each cell based on the linking permeability and cell geometry is performed for every cell and stored in memory. There are a number of such models for transmissibility calculation to those familiar with the art depending on the input data (such as block-face or block-center permeability). In addition, the pore volume of every cell is computed and stored in memory.

Initialize Reservoir (Step 44): Before simulation takes place, the initial distribution of the fluids in the reservoir must be computed. This process involves iteration for the pressure at every cell. The pressure at every point is equal to a "datum" pressure plus the hydrostatic head of fluid above it. Since hydrostatic head at a cell depends on the densities of the column of fluid above it, and density itself depends on pressure and fluid composition via an equation of state (or EOS, described below), the solution is iterative in nature. At each cell, the computed pressure is used to compute a new density, from which a new hydrostatic head and cell pressure is recomputed. When the pressure iterated in this fashion does not change any further, the system has equilibrated and the reservoir is said to be "initialized."

Read Recurrent Data (Step 46): Recurrent data read in during step 46 is time-varying data and, as such, it must be read at every time step during the simulation. It includes the oil, gas and water rates of each well that have been observed during the "history" period of the simulation (the period of known field production data that is used to calibrate the simulator). It also includes production policies that are to be prescribed during the "prediction" phase (the period of field production that the simulator is expected to forecast). Production policy data include data such as rates required from each well or group of wells and constraints that should be imposed on the simulation (such as maximum gas-oil ratios, minimum bottom-hole-pressure allowed per well, etc.). This data can change over periods of time based on actual field measurements during the "history" phase, or based on desired throughput during the "prediction" phase.

EOS determination (Step 48): Fluid behavior is assumed to follow an equation-of-state (EOS). The EOS typically chosen in the art should be accurate for both liquid and vapor phase, since its main purpose is to provide densities and fugacity coefficients for both phases during phase equilibrium calculations. Phase equilibrium calculations according to the present invention during step 48 are performed in the CPU's 12 as indicated at 50 and in the GPU's 14 as indicated at 52 in accordance with the techniques described in commonly owned, co-pending U.S. patent application Ser. No. 12/827,477, "Reservoir Simulation of Giant Subsurface Reservoirs with Accelerated Phase Equilibrium Determination", filed Jun. 30, 2010, of which Applicants are co-inventors, and which is incorporated herein by reference for all purposes.

Jacobian generation (Step 54): In addition to the phase equilibrium determinations performed during step 48 described above, one species balance equation for each component, plus water, must be solved (i.e. a total of $N_c+1$ species equations) by computer processing. The species balance equation takes two forms in the present invention: the more common Darcy form, which assumes that the pressure drop relates linearly to flow velocity, and a Forchheimer form, which adds a quadratic velocity term which is of importance for higher velocity flows, particularly for gas reservoirs. For this discussion, the simpler, conventional Darcy form is used:

$$\frac{\partial N_i}{\partial t} = \nabla \sum_{j=1}^{P} \cdot \rho_j \frac{K k_{rj}}{\mu_j} \xi_{ij} (\nabla P - \gamma_j \nabla z) + q_i$$

where the parameters and variables are defined in the conventional manner.

A suitable form of water balance equation for use in modeling according to the present invention, and using parameters and variables as defined above, is as follows:

$$\frac{\partial N_w}{\partial t} = \nabla \cdot \rho_w \frac{K k_{rw}}{\mu_w} (\nabla P - \gamma_w \nabla z) + q_w$$

Linear Solution (Step 56): The system of linear equations is a very large, but sparse, matrix of sub-blocks organized in accordance to the present invention to enable the processing load of determination of unknowns in the equations to be reduced, as will be described.

Matrix Organization

The present invention provides GPU acceleration to the process of solving the general linear system $Ax=R$ where A is the system matrix (typically the Jacobian of the nonlinear system of equations being solved), x is the vector of system solutions and R is the vector of right-hand-sides of the linear system. In reservoir simulation, this system arises repeatedly during nonlinear iteration of the conservation equations via Newton's method.

In Newton's method, the Jacobian matrix (J), the nonlinear residuals (F) and the nonlinear iteration updates of the variables (s) are related by the equation Js=−F. Comparing with the canonical linear system Ax=R above, A represents the Jacobian. "J", x represents the solution updates "s" and R represents the nonlinear residual right-hand-side "−F" (with negative sign to make the Newton updates directly additive to the current variable state).

Figures 5, 6:
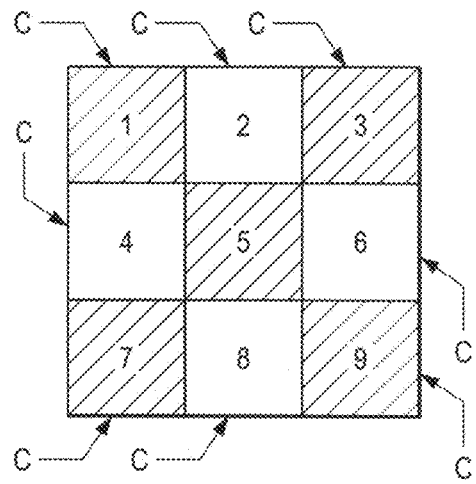
FIG. 5 is a schematic diagram of a two-dimensional ordering of portions of a grid of adjacent cells of the reservoir of FIG. 1.
FIG. 6 is a schematic diagram of a restructured two-dimensional ordering according to the present invention of portions of a grid of adjacent cells of the reservoir of FIG. 1.

Consider FIG. 5 which illustrates a simple natural ordering of adjacent cells of the reservoir in a grid, drawn in two-dimensions only, for simplicity. This grouping of cells for the reservoir is indicated schematically at step 60 of FIG. 8. The cells are assembled, in two distinct groups (1 indicated as cross-hatched and 2 as indicated as blank) in a checkerboard pattern. The unknowns for the blank cells in group 2 are to be identified with even numbered subscripts and the cross-hatched cells of group 1 with odd numbered subscripts. The group or ordering of cells in the manner shown in FIG. 5 during step 60 results in a finite-difference stencil composed of five connections (east "e", west "w", north "n", south "s" and center-diagonal "d"). The grouping or organization of alternate ones of the reservoir cells into two distinct groups in this manner generates a matrix structure which is then reordered or assembled during step 62 (FIG. 8) as illustrated schematically in the matrix structure shown in FIG. 6.

It is to be noted that the matrix structure of FIG. 6, assembled in reordered form in four different quadrants, groups the odd-numbered unknowns in the upper part of the matrix and the even-numbered unknowns in the lower part of the matrix. The matrix fill is sparse, so only the labeled entries need be stored in memory. For notational convenience, the upper left quadrant of odd-numbered diagonal teams in FIG. 6 is labeled as $C_1$, the upper right quadrant of odd-numbered west-east-north-south terms as $M_1$, the lower left quadrant of even-numbered west-east-north-south terms as $V_2$ and the lower right quadrant of even-numbered diagonal terms as $C_2$.

Figures 7, 8:
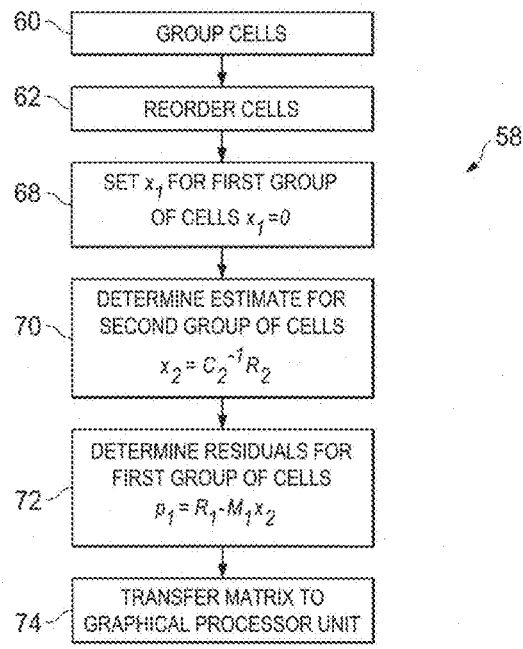
FIG. 7 is a schematic two-dimensional diagram of a three-dimensional ordering according to the present invention of portions of a grid of adjacent cells of the reservoir of FIG. 1.
FIG. 8 is a functional block diagram of a portion of a set of data processing steps performed by a computer data processing unit or CPU of the computer system of FIG. 3 during computerized reservoir simulation of a subterranean reservoir according to the present invention.

Extension to a three dimensional grid is straightforward in that two new entries appear in the matrix: the "above" and "below" connections which are adjacent to the diagonal terms in the $C_1$ and $C_2$ matrices. In other words, the three dimensional grid transforms those diagonal matrices into tri-diagonal form as illustrated in FIG. 7.

It will be seen in the description that follows that assembly by ordering and reordering of the unknowns in the manner described as indicated schematically at steps 60 and 62 (FIG. 8) succeeds in providing a linear solution that can be processed in two parts treating roughly half of the unknowns every time. This is advantageous for the GPU for two reasons: the amount of data transfer from the CPU to the GPU is cut in half and the amount of data residing in GPU memory (which is smaller than that of CPU's) is also cut in half.

After re-ordering of the cells into two subgroups (which are labeled 1 and 2, as noted), matrix A has the form:

$$A = \begin{bmatrix} C_1 & M_1 \\ V_2 & C_2 \end{bmatrix} \quad (1)$$

so that the original system of matrix equations to be solved by processing is:

$$\begin{bmatrix} C_1 & M_1 \\ V_2 & C_2 \end{bmatrix} \begin{bmatrix} x_1 \\ x_2 \end{bmatrix} = \begin{bmatrix} R_1 \\ R_2 \end{bmatrix} \quad (2)$$

Figure 9:
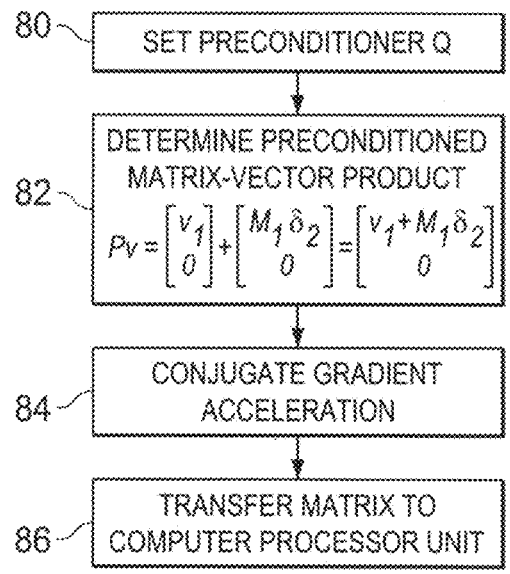
FIG. 9 is a functional block diagram of the portion of a set of data of processing steps performed in a graphical processing unit or GPU of the computer system of FIG. 3 during computerized reservoir simulation of a subterranean reservoir according to the present invention.

The iterative linear solution in the data processing system P of the present invention in its basic form takes the form of three steps or stages. The first is initialization during process step a sequence of steps indicated generally at 58 (FIG. 8) which is performed in the CPU's 12. The second step is preconditioned conjugate-gradient extrapolation during a sequence of process steps indicated generally at 64 (FIGS. 4 and 9) which is performed in the GPU's 14. The third stage or step, on return of the preconditioned system solutions from the GPU's 14 after processing, occurs during a sequence of steps indicated generally at 66 (FIG. 10) and transforms in the CPU's 12 the preconditioned system solutions to those of the original matrix system.

Initialization Step

An initial estimate during step 68 (FIG. 8) for all cells in group 1 of the matrix is set to zero:

$$x_1 = 0 \quad (3)$$

The initial estimate for all cells in group 2 is determined during step 70 in a manner so that group 2 residuals are always zero. This precludes the need to update the group 2 residuals in the GPU and reduces the dimensionality of the GPU burden by roughly half. Mathematically, this is accomplished by the following manipulations of the original system. Linear equation residuals are given by:

$$\begin{bmatrix} \rho_1 \\ \rho_2 \end{bmatrix} = \begin{bmatrix} R_1 \\ R_2 \end{bmatrix} - \begin{bmatrix} C_1 & M_1 \\ V_2 & C_2 \end{bmatrix} \begin{bmatrix} x_1 \\ x_2 \end{bmatrix} \quad (4)$$

Setting group 2 residuals to zero:

$$\rho_2 = R_2 - V_2 x_1 - C_2 x_2 = 0 \quad (5)$$

Given that $x_1 = 0$, an initial estimate can be generated during step 70 for $x_2$ as follows:

$$x_2 = C_2^{-1} R_2 \quad (6)$$

This implies solution of a tridiagonal system of cells of group 2 which is passed to the GPU. It is to be noted that no group 1 cells need to be transferred to the GPU in step 70.

The initial residuals for the cells of group 1 are computed during step 72 from equation (4) above (remembering that $x_1 = 0$):

$$\rho_1 = R_1 - M_1 x_2 \quad (7)$$

Transferring and processing the linearized, reordered matrix information from the CPU's 12 to the GPU's 14 during step 74 is preferably accomplished with either of the following known techniques: low level C-programming (e.g. NVidia's CUDA-C), or high-level FORTRAN-90 programming (e.g. CUDA-FORTRAN or acceleration directives, as in the commercial PGF90 compiler by The Portland Group).

Conjugate-Gradient Extrapolation

A preconditioner Q is selected and used during step 80 (FIG. 9) of conjugate gradient extrapolation to improve the condition number of the original matrix A. This step, the system matrix being non-symmetric and perhaps poorly conditioned, transforms the equation matrix into a better conditioned system (i.e. better clustering of the eigenvalues) that converges in much fewer iterations than the original system. In some reservoir models, weak preconditioning can cause the linear solution to diverge altogether, thus stopping the simulation. Therefore, robust preconditioning is a must. This need becomes more important as systems with high geological heterogeneity and small cell sizes are solved (e.g. seismic-scale models).

In the present invention, a Z-line Gauss-Seidel preconditioner has been implemented on the GPU's with maximum efficiency to process half of the system unknowns in one single communication pass to a GPU. This enables the GPU to treat much larger systems of equations than other schemes would allow it for the same amount of RAM memory (a scarce commodity in today's GPU's) and data traffic.

Once a preconditioner is selected, the matrix-vector product $AQ^{-1}v=Pv$ is required for any conjugate-gradient scheme. The selected preconditioner Q used in the processing techniques according to the present invention is what is known in the art as a "right" preconditioner in the sense that it preconditions matrix A "from the right" and therefore does not change the value of the original system residual or right-hand side, as can be seen below:

$$Ax=R \qquad (8)$$

$$AQ^{-1}Qx=R \qquad (9)$$

Therefore, making $P=AQ^{-1}$ and $y=Qx$, the system of matrix equations becomes:

$$Py=R \qquad (10)$$

It is to be noted that this implies that, after solving the system for unknowns "y" via conjugate-gradient acceleration, the true solutions "x" are obtained by the inverse transformation:

$$x=Q^{-1}y \qquad (11)$$

Q is chosen for the process according to the present invention to be a Z-line preconditioner of the Gauss-Seidel type. The terminology "Z-line" arises because the main diagonal sub-matrices $C_1$ and $C_2$ (FIGS. 6 and 7) contain the vertical columns of the 3D reservoir grid (i.e. the Z-direction of the reservoir grid):

$$Q = \begin{bmatrix} C_1 & 0 \\ V_2 & C_2 \end{bmatrix} \qquad (12)$$

It is also to be noted here that $A=Q+M_1$ if equation (12) is compared with equation (1) above. Therefore, the following equalities hold:

$$Pv=AQ^{-1}v=(Q+M_1)Q^{-1}v=v+M_1Q^{-1}v$$

Or, in full matrix notation:

$$Pv = \begin{bmatrix} v_1 \\ v_2 \end{bmatrix} + \begin{bmatrix} 0 & M_1 \\ 0 & 0 \end{bmatrix} \begin{bmatrix} C_1 & 0 \\ V_2 & C_2 \end{bmatrix}^{-1} \begin{bmatrix} v_1 \\ v_2 \end{bmatrix} \qquad (13)$$

Since according to the present invention the residuals for the cells of group 2 are always zero:

$$Pv = \begin{bmatrix} v_1 \\ 0 \end{bmatrix} + \begin{bmatrix} 0 & M_1 \\ 0 & 0 \end{bmatrix} \begin{bmatrix} C_1 & 0 \\ V_2 & C_2 \end{bmatrix}^{-1} \begin{bmatrix} v_1 \\ 0 \end{bmatrix} \qquad (14)$$

a matrix-vector multiplication which reduces to:

$$Pv = \begin{bmatrix} v_1 \\ 0 \end{bmatrix} + \begin{bmatrix} 0 & M_1 \\ 0 & 0 \end{bmatrix} \begin{bmatrix} \delta_1 \\ \delta_2 \end{bmatrix} \qquad (15)$$

where:

$$\begin{bmatrix} C_1 & 0 \\ V_2 & C_2 \end{bmatrix} \begin{bmatrix} \delta_1 \\ \delta_2 \end{bmatrix} = \begin{bmatrix} v_1 \\ 0 \end{bmatrix} \qquad (16)$$

This system is easily solved for $\delta_1$ and $\delta_2$ in two steps by multiplying out the terms in equation (16):

$$\delta_1 = C_1^{-1} v_1 \qquad (17)$$

$$\delta_2 = -C_2^{-1} V_2 \delta_1 \qquad (18)$$

Equation (18) is implemented so that the matrix-vector product $V_2 \delta_1$ is computed first and then the tridiagonal system is solved for $\delta_2$.

The preconditioned matrix-vector product is obtained as indicated at step 82 (FIG. 9) which can be expressed by:

$$Pv = \begin{bmatrix} v_1 \\ 0 \end{bmatrix} + \begin{bmatrix} M_1 \delta_2 \\ 0 \end{bmatrix} = \begin{bmatrix} v_1 + M_1 \delta_2 \\ 0 \end{bmatrix} \qquad (19)$$

Once the preconditioned matrix-vector product Pv is determined, the conjugate-gradient acceleration is performed during step 84 (FIG. 9) using either of two acceleration methods, the biconjugate gradient stabilized method (BiCGSTAB) or the transpose-free quasi-minimal residual method (TFQMR), examples of which are described below. As indicated in the general discussion, the choice of accelerator impacts GPU performance and bi-conjugate Lanczos methods have a clear memory advantage over traditional Krylov methods in that the latter must store multiple orthogonal direction vectors in order to provide robust performance. This additional storage is impractical considering memory limitations of GPU's.

The process of conjugate-gradient acceleration of the preconditioned system of equations is performed to iterate the system until solution convergence. Being mindful of GPU memory restrictions, a Lanczos method was preferred over traditional CPU-based Krylov methods. Since Krylov methods would require a sufficiently large number of orthogonal directions to converge robustly on seismic-scale, geologically-heterogeneous reservoir models, saving this many vectors in GPU memory would prove impossible. In addition, expensive motion between GPU and CPU for temporary storage would adversely impact performance. Instead, Lanczos bi-conjugate gradient approaches obviate the need for orthogonalization storage and provide very good stability in its more advanced variants, such as the Bi-Conjugate Gradient Stabilized method (BiCGSTAB) chosen here. Another candidate for implementation with the present invention is the TFQMR method (Transpose-Free Quasi-Minimum Residual), which also avoids storing orthogonal directions, but has a higher operation count (cost) and did not provide any discernible advantage for isothermal reservoir simulation models. TFQMR does, however, provide additional robustness to the solution of chemical-kinetics equations in nonisothermal Chemically-Enhanced Oil Recovery and Basin Simulation, where temperature becomes one of the unknowns and the system becomes stiff due to the exponential terms containing reaction activation energies (i.e. Arrhenius-type kinetics).

Bi-Conjugate Gradient Stabilized Methodology (BiCGSTAB)

The computational steps for this technique of conjugate-gradient acceleration are as follows:

1) Compute initial residual:
   $r_0 = b - Ax_0$
2) Set initial direction vector:
   $p_0 = r_0$
3) For iteration $k = 0, 1, 2, \ldots$ until convergence.

Do:

4) $\alpha_k = \dfrac{(r_k, r_o^1)}{(Ap_k, r_o^e)}$

5) $s_k = r_k - \alpha_k A p_k$

6) $w_k = \dfrac{(As_k, s_k)}{(As_k, As_k)}$

7) $x_{k+1} = x_k + \alpha_k p_k + w_k s_k$

8) $r_{k+1} = s_k - w_k A s_k$

9) $\beta_k = \dfrac{(r_{k+1}, r_o^1)}{(r_k, r_o^1)} \times \dfrac{\alpha_k}{w_k}$ 10) $p_{k+1} = \gamma_{k+1} + \beta_k(v_k - w_k A p_k)$ 11) End Do The convergence criterion is measured by the value of the L2-norm of the residual (r). Typically, when this norm is less than a prescribed tolerance (0.01 or lower) the process has converged. In models according to the present invention, the norm of the relative residual value (current residual divided by initial residual) is checked against a prescribed tolerance to avoid that very large or very small values on the initial residual bias the number of iterations required for convergence, $$\left\| \dfrac{r_{k+1}}{r_0} \right\| < \epsilon$$

Transpose-Free Quasi-Minimum Residual Methodology (TFQMR)

The computational steps for this technique of conjugate-gradient acceleration are as follows:

1) Compute initial residual and initialize variables:
   $r_o = b - Ax_o$
   $w_o = u_o = r_o$
   $v_o = Au_o$
   $d_0 = \theta_0 = \sigma_0 = 0$
2) Compute initial error norm:
   $\tau_0 = \|r_c\|$
3) For iteration $k = 0, 1, 2, \ldots$ until convergence.

Do:

4) If $k$ is even, compute:
   $\alpha_{k+1} = \alpha_k = \dfrac{\rho_k}{(v_k, r_o^1)}$
   $u_{k+1} = u_k - \alpha_k v_k$ 5) $w_{k+1} = w_k - \alpha_k A u_k$ 6) $d_{k+1} = u_k - \dfrac{\theta_k^2}{\alpha_k} \sigma_k d_k$ 7) $\theta_{k+1} = \dfrac{\|w_{k+1}\|}{\tau_k}$ 8) $c_{k+1} = (1 + \theta_{k+1}^2)^{-1/2}$ 9) $\tau_{k+1} = \tau_k \theta_{k+1} c_{k+1}$ 10) $\sigma_{k+1} = c_{k-1}^2 \alpha_k$ 11) $x_{k+1} = x_k + \sigma_{k+1} d_{k+1}$ 12) If $k$ is odd, compute:
   $\rho_{k+1} = (w_{k+1}, r_o^\infty)$
   $\beta_{k-1} = \dfrac{\rho_{k+1}}{\rho_{k-1}}$
   $u_{k+1} = w_{k+1} + \beta_{k-1} u_k$
   $v_{k+1} = A u_{k+1} + \beta_{k-1}(A u_k + \beta_{k-1} v_{k-1})$ 13) End Do The convergence criterion is measured by the value of the L2-norm of the residual (r). Typically, when this norm is less than a prescribed tolerance (0.01 or lower) the process has converged. With the present invention, the norm of the relative residual value (current residual divided by initial residual) is preferably checked against a prescribed tolerance to avoid that very large or very small values on the initial residual bias the number of iterations required for convergence, i.e.:

$$\left\| \dfrac{r_{k+1}}{r_0} \right\| < \epsilon$$

Transform Solutions to Those of the Original System

As indicated previously, the conjugate-gradient extrapolation process during step 84 produces the solution "y" of the system Py=R (Equation 10) where $P=AQ^{-1}$ and y=Qx. The solution results are then transferred as indicated schematically at step 86 from the GPU 14 to the CPU 12 in a comparable manner to that of transfer from the CPU to the GPU described above.

Figure 10:
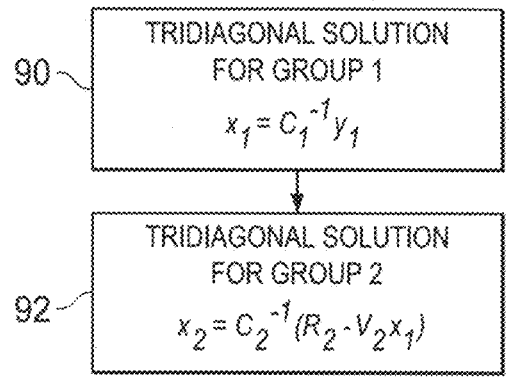
FIG. 10 is a functional block diagram of another portion of a set of data processing steps performed by a computer data processing unit or CPU of the computer system of FIG. 3 during computerized reservoir simulation of a subterranean reservoir according to the present invention.

Processing according to FIG. 10 by the CPU is then performed to transform the solutions to those of the original system. In such processing, $x=Q^{-1}y$ is obtained as indicated at step 90 by tridiagonal solution of the system Qx=y or, in matrix notation:

$$\begin{bmatrix} C_1 & 0 \\ V_2 & C_2 \end{bmatrix} \begin{bmatrix} x_1 \\ x_2 \end{bmatrix} = \begin{bmatrix} y_1 \\ y_2 \end{bmatrix} \qquad (20)$$

The first row of matrix Equation (20) yields:

$$x_1 = C_1^{-1} y_1 \qquad (21)$$

So far, all computations have used group 1 unknowns and, therefore, relieved the GPU from transferring, storing and computing half of the total system of equations, resulting in 50% saving in time required. It is to be noted, however, that this implies that $y_2$ is not available because there are no residuals to update for group 2 cells, as these were guaranteed to be zero by the way the process was initialized. In order to solve for $x_2$, the second row of the original system (2) can be expanded as:

$$V_2 x_1 + C_2 x_2 = R_2 \qquad (22)$$

and as indicated at step 92 solved for $x_2$ as follows:

$$x_2 = C_2^{-1}(R_2 - V_2 x_1) \qquad (23)$$

This only involves a tridiagonal solution for the group 2 cells so, once again, only half of the total system data needs to be transferred and processed by the GPU.

The present invention thus provides a Z-Line preconditioned iterative linear solver with BiCGSTAB and TFQMR conjugate gradient accelerations to take advantage of GPU hardware. The preconditioning strategy, which orients its robustness towards the vertical axis (Z-Line) is based on the need to solve large system of equations in layered formations composed of porous media, which are possibly highly-heterogeneous geologically in both porosity and permeability characteristics.

The preconditioning design strives to be frugal in both CPU-GPU communication intensity and GPU-memory utilization by only requiring that roughly half of the unknowns be processed in the GPU at one time while fully exploiting a mixed-paradigm MPI and OpenMP parallelization. OpenMP keeps all CPU cores busy, which is an important requirement since the number of available CPU cores has been increasing from 4 (Intel Nehalem) to 6 (new Intel and AMD processors) and going on to 8 and possibly higher.

Alternatively, the CPU cores can use MPI parallelization but this is currently at a disadvantage due to the already heavy load on the CPU of handling data transfers to GPU. Parallelization across individual GPU's is at the MPI level (via its connection to its host CPU), while parallelization within each GPU is many-core multi-threaded. Therefore, the present invention strives to obtain the best parallelization in each of the hybrid components of the computer (CPU and GPU).

In addition, currently available GPU memory (as compared to that of a CPU) requires minimizing the amount of data that must be processed in the GPU at one time (GPU's typically have up to 4 GB of RAM, although 6 GB will soon appear in the market, compared to today's CPU's with 32 to 64 GB RAM readily available).

On the other hand, handling of the multiple-unknowns-per cell in a reservoir-simulation linear solver is very advantageous for the GPU's 240-cores (e.g. NVidia Tesla GPU) or 448-cores (e.g. NVidia Fermi GPU) and provide a great processing advantage as compared against relatively few CPU cores. This results in considerable performance gain in processing speed.

Solution Update (Step 96): Returning to FIG. 4, the solution vector δx obtained from solving the system of linear equations represents the updated solution vector s of Newton's method discussed above in the nonlinear iteration loop. Although this is, for the most part, what is known in the art as "Newton iteration", some checks to damp the solution vector take place in the present invention in order to improve the numerical stability of the simulation. As a result, the full "Newton step" is not always taken. More specifically, the reservoir pressure and fluid saturations are controlled, so that the solution does not drift into conditions that may drastically change the computation in individual cells which potentially can adversely affect convergence. The present invention has incorporated a user-controlled parameter for these quantities. For example, experience shows that a change limit of 500 psi (for pressure) and 5 percent or 0.05 (for saturations) per nonlinear iteration greatly contributes to reduce the number of time step cuts discussed in the next paragraphs during simulation. This is, of course, reservoir model-dependent and overriding of these limits may be done by simulator engineers familiar with the reservoir or field being simulated.

Convergence Test (Step 98): The individual residuals of the linear equations resulting from step 96 are checked against user-prescribed tolerances. If these tolerances are satisfied, the nonlinear iteration loop is exited, solution output is written to file during step 100 for the current time step and the time step is advanced during step 102 to the next level.

If these tolerances are not satisfied, processing according to the nonlinear iteration loop returns to step 48 and continues. But if the number of nonlinear iterations becomes excessive (typically more than 6, but otherwise a user-prescribed parameter), a decision is made to cut the time step size (by usually 50%) and repeat the entire nonlinear iteration loop again beginning at step 48 for the same time level. An excessive number of iterations is an indication that the solution has diverged and the changes may be too large to be adequately modeled with the time step previously chosen. A time-step cut is expected to not only reduce the magnitude of these changes but to also increase the diagonal dominance of the Jacobian matrix, which always has a beneficial effect on the convergence of the linear solver.

Write Output (Step 100): Measures of the determined fluid motion variables in the form of three-dimensional grids are written out in binary format as Disk I/O at the end of each time step. Also well information regarding other required data or measurements such as oil, gas, and water production rates per well, gas/oil ratio (GOR) per well and static well-head pressure (SWP) per well may be written out.

Figure 11:
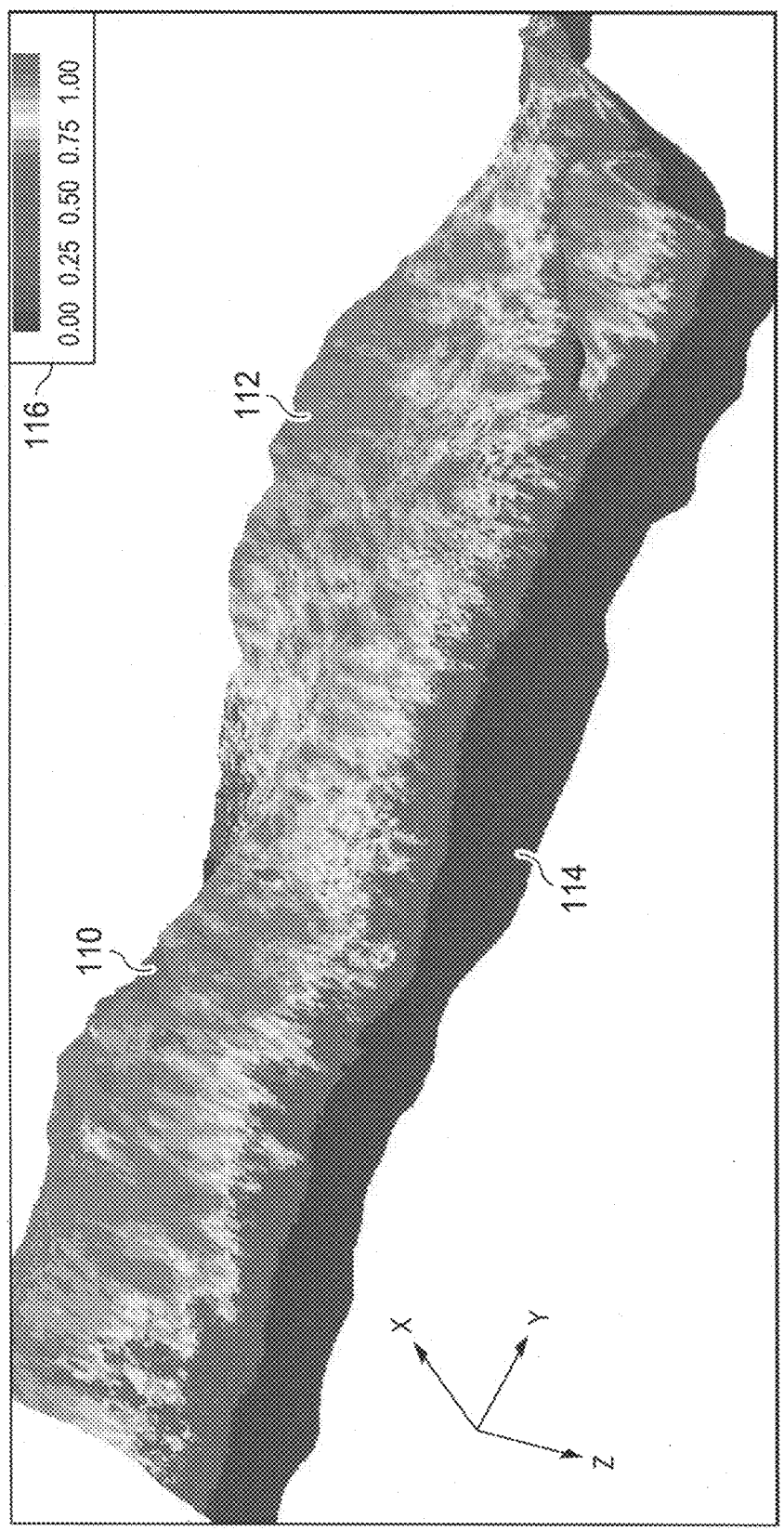
FIG. 11 is an isometric view of an image of a three-dimensional output display of oil saturation in an oil reservoir of interest obtained according to the present invention for a time of interest.

Disk I/O is performed in a serial fashion in the sense that the information contained in each MPI process is broadcast to the master process, which is in charge of writing the output to disk files. When parallel I/O hardware is available (i.e., multichannel RAID disks), each MPI process may write independently using as many channels as are available to attain higher through throughput. Once the model has been completed for a time of interest, data relating to that model may be presented in output displays. FIG. 11 is a 3D output of oil saturation predicted by the reservoir simulator for an oil field of interest for January 1 of a date of interest, in this case a future one in year 2025. The orange-red areas such as at 110 and 112 indicate high oil saturation and may suggest to the engineer locations where additional well drilling will be beneficial. The blue area 114 at the bottom of the image indicates water. As can be seen, the oil saturation color scale 116 goes from 0 (100% water) to 1 (100% oil).

Figure 12:
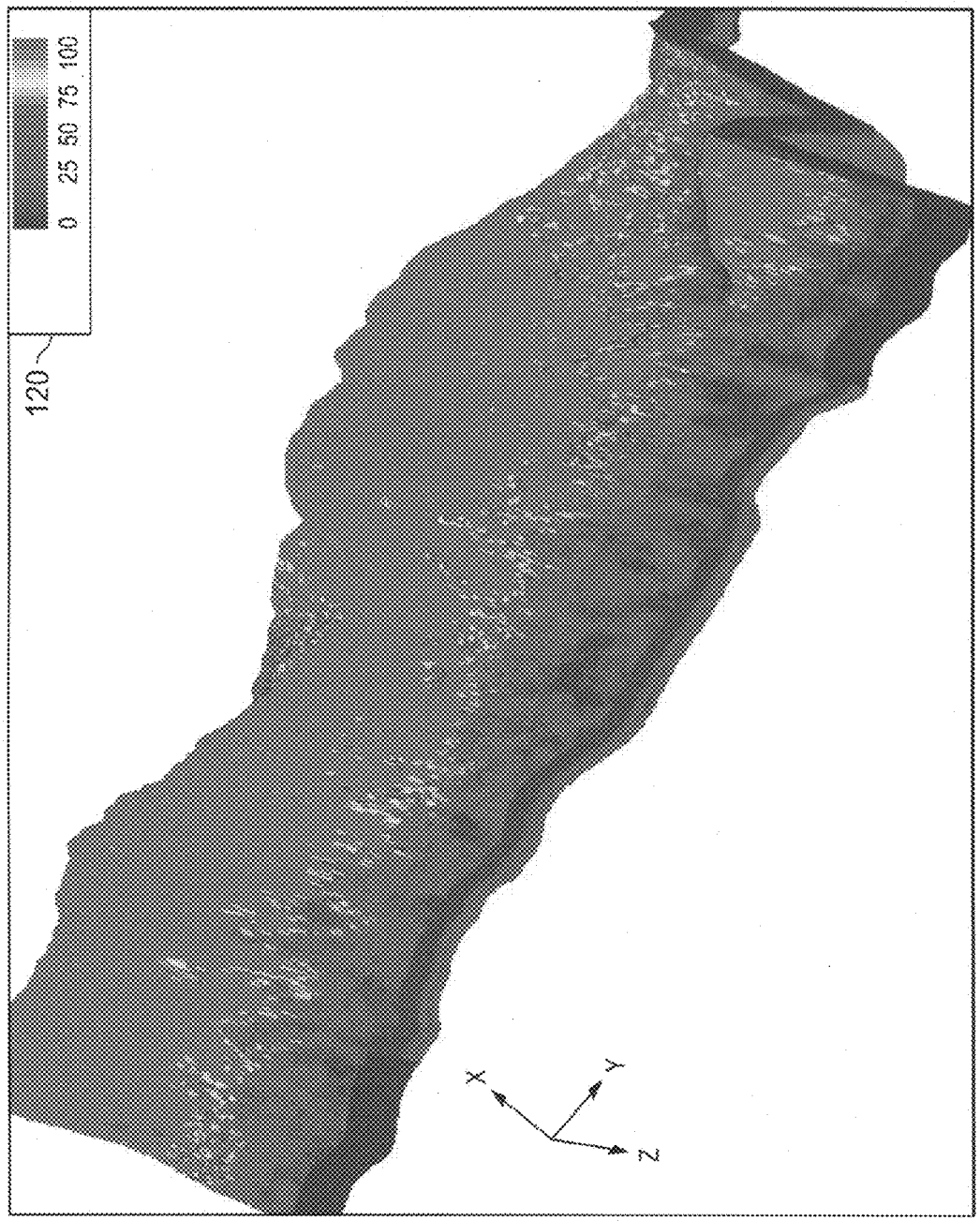
FIG. 12 is an isometric view of an output image of formation resistivity for the reservoir of FIG. 11 for a time of interest.

FIG. 12 is the corresponding formation resistivity for the simulation in FIG. 11 at the same date of interest. Resistivity (in units of ohm.meter) ranges from very low values for water and very high values (which have been clipped to a maximum of 100 in color scale 120 in this plot). Resistivity is an important variable obtained from simulator equations and is used in planning EM (electromagnetic) monitoring campaigns. Further information about resistivity can be seen in Equation number 17 in the commonly-owned U.S. Pat. No. 7,660,711 "Automated Event Monitoring System for Online Reservoir Simulation", which is incorporated herein by reference. Equations 1 to 17 in that patent all augment the information and application of reservoir simulation to Intelligent Field operations and reservoir monitoring.

Figure 13:
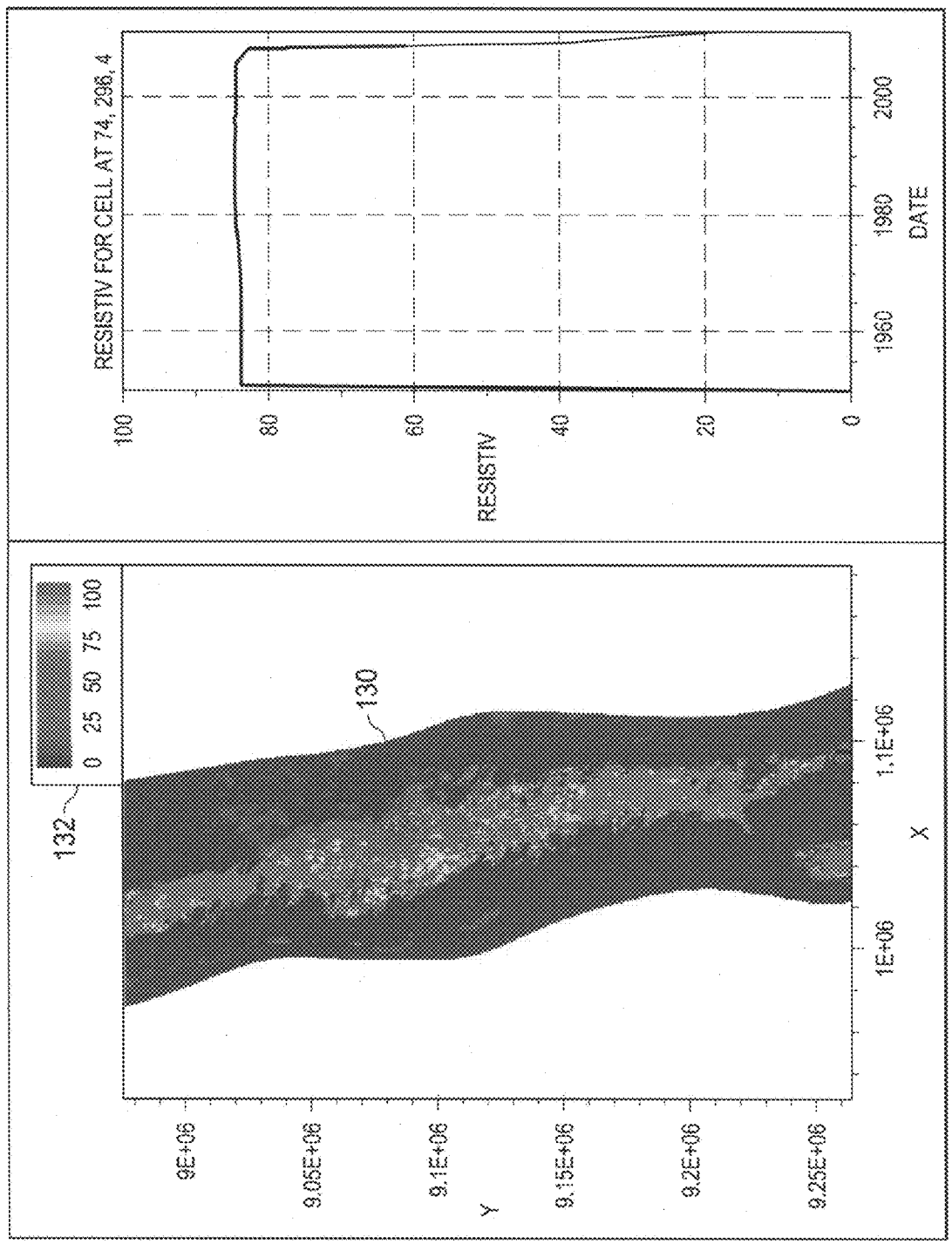
FIG. 13 is a plan view at a particular layer in the model of the reservoir of FIGS. 11 and 12 at a time of interest.

FIG. 13 is a plan view of a geological layer (number 4) in the same reservoir showing as indicated at 130 and with color scale 132 the Resistivity for that particular layer on an earlier date (Jan. 1, 2010). Upon clicking with a mouse on any point of this map, a line-plot is instantly displayed on the right-hand side of the display which shows the "history" of the resistivity change over time at that location (in this particular example, corresponding to cell location 74,296,4). In planning reservoir monitoring, it is important to observe that the resistivity line-plot shows a high value for the oil-bank which suddenly drops around year 2010, indicating that a water flooding front has reached this particular location in the reservoir. Such information is important for proper planning of reservoir monitoring and future production forecasts.

The present invention is capable of processing the volumes of data for seismic-scale reservoir simulation (with structured grid dimensions in x and y ranging from 12.5 meter to 50 meters) in giant reservoirs. Current GPU hardware is not able to efficiently handle unstructured grid information due to the performance limitations of memory indirect-addressing in GPU's. In the future, the use of texture memory for indirect-addressing in the GPU will become commonplace. But, since texture memory is usually a small percentage of total memory (and total memory is still small on current GPU's), one anticipates that GPU evolution will dictate that global memory will increase first and then texture memory will begin to be used efficiently in unstructured domains.

The steps of the conjugate-gradient extrapolation processing process need to be carried out for each nonlinear (e.g. Newton) iteration of the simulator, at each time step. Considering that a typical model for giant reservoirs may have 500-million-cells and require an average of 4 nonlinear iterations per time step and an average of 2000 time-steps for a 50-year simulation, the number of giant linear system solutions with matrices of order 1.5-billion-equations or more is in the many thousands. Therefore, acceleration of this important feature of the present invention has a dramatic impact on overall simulation turnaround time.

With the present invention, transformation of the computer processing is provided with a transition between CPU-only computation to a heterogeneous computation model where the CPU still takes care of reading the data, providing logic control and allocating local memory, but passes the heavy computational burden to the GPU.

A certain amount of overhead is incurred in the three-stage process for every cell-block in the reservoir model using the techniques of the present invention discussed above:
   a. Transfer the data (linearized Jacobian matrix and right-hand-side nonlinear residuals) from the CPU's 12 to the GPU's 14;
   b. Perform numerical computations on the GPU's 14 to solve the linear system iteratively; and
   c. Transfer the computation results (linear system solution) generated in solving the linear system back to the CPU' 12.

Given the large amount of computation involved, results obtained with the present invention have shown that the cost of bi-directional transfer of the data between CPU and GPU is negligible compared with the considerable performance gain (speedup) obtained from performing the compute-intensive processing on the GPU. This is particularly true for the multi-million and billion-cell requirement in reservoir simulation based on the frugal data usage of the preconditioning scheme according to the present invention discussed above.

It is to be noted that the CPU-GPU communication process is different, but complementary, to the parallelism of the implementation. Each computer "node", including one or more multi-core CPU and one or more many-core GPU, handles only the "chunk" of reservoir assigned to it by the domain decomposition of the parallelization (i.e. MN implementation). A large number of these processor nodes operate in parallel, with the typical compute "cluster" composed of 512 of those nodes, each node typically composed of two 4-core CPU's and two 240-core GPU's.

Currently, the designations of "multi-core" CPU's are evolving between 4 and 8 computational cores per CPU and designations of "many-core" GPU's are evolving between 240 and 448 computational cores per GPU.

At the present time, a CPU core contains considerably more memory (about 100 times more) and higher clock frequency (about double to triple) than that of a GPU core. The limited memory imposes the need to selectively transfer the required information between the CPU and the GPU. It is also to be noted that the slower clock of the GPU core, relative to the CPU, is more than compensated for by the much larger number of GPU cores against CPU cores (50 to 100 times more).

Performance Comparison

It should be understood that the present invention is capable of performance in a number of types of computer and thus is independent of the specific computer hardware described herein. In an exemplary embodiment, sixteen GPU's (NVidia Tesla S1070, with 240 cores each) and 16 Intel Nehalem quad-core CPU's were used. For a maximum reservoir model size fitting in this configuration of 50-million-cells, the speedup obtained was 6.04 (speedup defined as how many times faster the job completes incorporating GPU's than using CPU's alone).

On a larger hardware system composed of 128-GPU's (QuadroPlex FX5800) and 128 CPU (Intel Nehalem quad-core), a 7.1 speedup was obtained on a 130-million-cell model. This increased to 8.7 for a 260-million-cell model and to 9.0 for a 520-million-cell model (this being the limiting maximum size given available GPU memory).

Another important measure of efficiency is the scalability (i.e. parallelization efficiency) of the processing for a model of fixed size as the number of GPU and CPU are increased. Linear solutions for reservoir simulation can be made highly scalable on CPU's and the present invention demonstrates that this is also true on GPU's. For scalability testing, a model size was chosen that would fit in a different number of GPU's (130-million-cells) and this model was run on a system formed of QuadroPlex FX5800 CPU's and Intel Nehalem CPU's.

Using the reference scalability of 1.0 for 32 GPU-CPU, running with 64 CPU-CPU gave 2.03 tithes faster execution (scalability=2.03). Running with 128 CPU-CPU gave 3.96 times faster execution (scalability=3.96). It can be seen that scalability of 2.03 (better than linear) is achieved in these types of linear systems for giant models, since very often the smaller CPU-CPU counts are constrained by being unable to use cache (fast memory) effectively due to the large amount of data involved. When the number of processors is increased, better cache utilization is available and performance can become slightly "superlinear", as in this case.

Table 1 below, comparing 128 GPU's against 128 CPU's, includes a column entitled SPEEDUP, which refers to the increase in speed (reduction in computer time) resulting from performing linear solver computations on the GPU, as compared to performing the same computations on the CPU only.

TABLE 1

| CELLS (millions) | SPEEDUP |
| --- | --- |
| 50 | 6.04 |
| 130 | 7.1 |
| 260 | 8.7 |
| 520 | 9.0 |

Table 2 below illustrates the performance scalability as the number of CPU's and GPU's are increased for a fixed-size model (130 million cells). In each case, the number of CPU's is equal to the number of GPU's utilized.

TABLE 2

| NUMBER OF GPU's = NUMBER OF CPU's | SCALABILITY |
| --- | --- |
| 32 | 1.0 (reference) |
| 64 | 2.03 |
| 128 | 3.96 |

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of computerized simulation of a subsurface reservoir in a computer system of a plurality of data processors, including at least one central processing unit and at least one graphical processing unit, and an output display, the computerized simulation being an iterative linear solution of equations for reservoir parameters of a subsurface reservoir, the subsurface reservoir being simulated as a model partitioned into a number of cells arranged in an organized system of cells, the simulation further being based on geological and fluid characterization information for the cells of the reservoir, the method comprising the computer processing steps of: (a) receiving geological and fluid characterization information for the cells of the reservoir in the central processing unit; (b) initializing a postulated system solution matrix in the central processing unit for the equations for parameters of the reservoir cells for transfer to the graphical processing unit; (c) performing a preconditioned conjugate-gradient extrapolation in the graphical processing unit on the initialized postulated system solution matrix received from the central processing unit to determine reservoir parameters; (d) transforming in the central processing unit the results of the preconditioned conjugate-gradient extrapolation of the initialized postulated system containing reservoir parameters to the system solution matrix; and (e) forming an output display of the reservoir parameters of the cells at desired locations in the subsurface reservoir to simulate performance and production from the reservoir.

2. The method of claim 1, wherein the computer processing step of initializing a postulated system solution matrix in the central processing unit comprises the step of forming an initial estimate of matrix values for a solution for a first set of alternately spaced cells in the reservoir.

3. The method of claim 2, further including the computer processing step of:
   determining an initial estimate for a second set of alternately spaced cells, which are adjacent the alternately spaced cells of the first set.

4. The method of claim 2, further including the computer processing step of:
   determining a residual matrix value for the first set of alternately spaced cells.

5. The method of claim 1, wherein the computer processing step of performing a preconditioned conjugate-gradient extrapolation in the graphical processing unit comprises the step of forming a matrix preconditioner on the initialized system solution matrix.

6. The method of claim 5, wherein the computer processing step of performing a preconditioned conjugate-gradient extrapolation in the graphical processing unit comprises the step of determining a preconditioned matrix-vector product.

7. The method of claim 5, wherein the computer processing step of performing a preconditioned conjugate-gradient extrapolation in the graphical processing unit comprises the step of conjugate gradient acceleration of the preconditioned matrix-vector product.

8. The method of claim 2, wherein the computer processing step of transforming in the central processing unit the results of the preconditioned conjugate-gradient extrapolation comprises the steps of:
   performing a tridiagonal solution for the matrix values for a solution for the first set of alternately spaced cells in the reservoir; and
   performing a tridiagonal solution for the matrix values for a solution for the second set of alternately spaced cells in the reservoir.

9. A data processing system for computerized simulation of state changes of fluids in underground layered formations of a reservoir in the earth, the data processing system comprising: (a) a central processor for performing the steps of: (1) receiving geological and fluid characterization information for cells of the reservoir; (2) initializing a postulated system solution matrix in a central processing unit for the equations for parameters of the reservoir cells for transfer to the graphical processing unit; (b) a graphical processor for performing the step of: performing a preconditioned conjugate-gradient extrapolation on the initialized postulated system solution matrix received from a central processing unit to determine reservoir parameters; (c) the central processing unit further performing the step of: transforming in the central processing unit the results of the preconditioned conjugate-gradient extrapolation of the initialized postulated system containing reservoir parameters to the system solution matrix; and (d) a memory for storing the determined reservoir parameters of the cells.

10. The data processing system of claim 9, wherein the central processing unit during initializing a postulated system solution matrix performs the step of:
   forming an initial estimate of matrix values for a solution for a first set of alternately spaced cells in the reservoir.

11. The data processing system of claim 10, wherein the central processing unit during initializing a postulated system solution matrix performs the step of:
   determining an initial estimate for a second set of alternately spaced cells, which are adjacent the alternately spaced cells of the first set.

12. The data processing system of claim 10, wherein the central processing unit during initializing a postulated system solution matrix performs the step of:
  determining a residual matrix value for the first set of alternately spaced cells.

13. The data processing system of claim 12, wherein the graphical processor during performing the computer processing step of performing a preconditioned conjugate-gradient extrapolation performs the step of:
  forming a matrix preconditioner on the initialized system solution matrix.

14. The data processing system of claim 13, wherein the graphical processor during performing the computer processing step of performing a preconditioned conjugate-gradient extrapolation performs the step of:
  determining a preconditioned matrix-vector product.

15. The data processing system of claim 14, wherein the graphical processor during performing the computer processing step of performing a preconditioned conjugate-gradient extrapolation performs the step of:
  conjugate gradient acceleration of the preconditioned matrix-vector product.

16. The data processing system of claim 15, wherein the central processing unit during the step of transforming the results of the preconditioned conjugate-gradient extrapolation performs the steps of:
  performing a tridiagonal solution for the matrix values for a solution for the first set of alternately spaced cells in the reservoir; and
  performing a tridiagonal solution for the matrix values for a solution for the second set of alternately spaced cells in the reservoir.

17. A non-transitory computer readable medium computer operable instructions for causing a data processing system comprising at least one central processing unit and at least one graphical processing unit, and an output display to simulate state changes of fluids in underground layered formations in the earth, the instructions stored in the non-transitory causing the data processing system to perform the following steps: (a) receiving geological and fluid characterization information for the cells of a subsurface reservoir in the central processing unit; (b) initializing a postulated system solution matrix in the central processing unit for the equations for parameters of the reservoir cells for transfer to the graphical processing unit; (c) performing a preconditioned conjugate-gradient extrapolation in the graphical processing unit on the initialized postulated system solution matrix received from the central processing unit to determine reservoir parameters; (d) transforming in the central processing unit the results of the preconditioned conjugate-gradient extrapolation of the initialized postulated system containing reservoir parameters to the system solution matrix; and (e) forming an output display of the reservoir parameters of the cells at desired locations in the subsurface reservoir to simulate performance and production from the subsurface reservoir.

18. The non-transitory computer readable medium of claim 17, wherein the instructions for initializing a postulated system solution matrix in the central processing unit comprise instructions causing the central processing unit to perform the computer processing step of: forming an initial estimate of matrix values for a solution for a first set of alternately spaced cells in the reservoir.

19. The non-transitory computer readable medium of claim 18, wherein the instructions for initializing a postulated system solution matrix in the central processing unit comprise instructions causing the central processing unit to perform the computer processing step of: determining an initial estimate for a second set of alternately spaced cells, which are adjacent the alternately spaced cells of the first set.

20. The non-transitory computer readable medium of claim 19, wherein the instructions for initializing a postulated system solution matrix in the central processing unit comprise instructions causing the central processing unit to perform the computer processing step of: determining a residual matrix value for the first set of alternately spaced cells.

21. The non-transitory computer readable medium device of claim 17, wherein the instructions for performing a preconditioned conjugate-gradient extrapolation in the graphical processing unit comprise instructions causing the graphical processing unit to perform the computer processing step of: forming a matrix preconditioner on the initialized system solution matrix.

22. The non-transitory computer readable medium of claim 21, wherein the instructions for performing a preconditioned conjugate-gradient extrapolation in the graphical processing unit comprise instructions causing the graphical processing unit to perform the computer processing step of: determining a preconditioned matrix-vector product.

23. The non-transitory computer readable medium of claim 22, wherein the instructions for performing a preconditioned conjugate-gradient extrapolation in the graphical processing unit comprise instructions causing the graphical processing unit to perform the computer processing step of: conjugate gradient acceleration of the preconditioned matrix-vector product.

24. The non-transitory computer readable medium of claim 17, wherein the instructions for transforming the results of the preconditioned gradient extrapolation in the central processing unit comprise instructions causing the central processing unit to perform the computer processing steps of: performing a tridiagonal solution for the matrix values for a solution for the first set of alternately spaced cells in the reservoir; and performing a tridiagonal solution for the matrix values for a solution for the second set of alternately spaced cells in the reservoir.

* * * * *